(12) United States Patent
Susen et al.

(10) Patent No.: US 7,035,386 B1
(45) Date of Patent: Apr. 25, 2006

(54) METHOD FOR VERIFYING ACCESS AUTHORIZATION FOR VOICE TELEPHONY IN A FIXED NETWORK LINE OR MOBILE TELEPHONE LINE AS WELL AS A COMMUNICATIONS NETWORK

(75) Inventors: Axel Susen, Aachen (DE); Stefan Brock, Sankt Augustin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/786,819

(22) PCT Filed: Aug. 30, 1999

(86) PCT No.: PCT/EP99/06371

§ 371 (c)(1),
(2), (4) Date: Jul. 9, 2002

(87) PCT Pub. No.: WO00/14730

PCT Pub. Date: Mar. 16, 2000

(30) Foreign Application Priority Data

Sep. 9, 1998 (DE) .................... 198 41 166

(51) Int. Cl.
*H04M 11/00* (2006.01)
(52) U.S. Cl. .................... 379/93.02; 379/88.02; 379/114.14
(58) Field of Classification Search ........ 379/902, 379/93.02, 88.02, 114.14, 114.15, 189, 221.09, 379/224; 704/233, 246, 270, 273, 272
See application file for complete search history.

(56) References Cited

U.S. PATENT DOCUMENTS

| 5,093,855 A | 3/1992 | Vollert et al. |
| 5,315,649 A | 5/1994 | Foster et al. |
| 5,335,276 A | 8/1994 | Thompson et al. |
| 5,502,759 A * | 3/1996 | Cheng et al. ............ 379/88.02 |
| 5,623,539 A | 4/1997 | Bassenyemukasa et al. |
| 5,717,743 A | 2/1998 | McMahan et al. |
| 5,806,040 A * | 9/1998 | Vensko ................ 704/273 |
| 5,926,533 A * | 7/1999 | Gainsboro ................ 379/188 |

FOREIGN PATENT DOCUMENTS

DE 32 29 658 2/1986

(Continued)

OTHER PUBLICATIONS

"Speaker Verification Over The Telephone Network", Thomas B. Schalk, Speech Technology, Man-Machine Voice Communications, US, Media Dimensions Inc., New York, Feb./Mar. 1991, vol. 5, nr. 3, pp. 32-35.
"Speaker Identity Verification Over Telephone Lines: Where we are and where we are going", T.C. Feustel et al., Zurich, Switzerland, ETH Zentrum-KT, pp. 181-182.

*Primary Examiner*—Melur Ramakrishnaiah
(74) *Attorney, Agent, or Firm*—Kenyon & Kenyon LLP (57) ABSTRACT

A method for verifying access authorization for voice telephony in a fixed network line or mobile telephone line, as well as a communications network having such access authorization verification are described. The access authorization is verified by analysis of a voice signal which was entered by the subscriber placing the call, before or during a call in progress. In one variant, the voice signal is entered as a password before the connection is established; in another variant, voice signals are analyzed for voice recognition and subscriber identification, the same voice signals also being transmitted to the person being called, making concealed access verification possible which does not hamper the normal flow of conversation.

10 Claims, 6 Drawing Sheets

FOREIGN PATENT DOCUMENTS

| | | |
|---|---|---|
| DE | 36 43 838 | 6/1988 |
| DE | 41 36 138 | 5/1993 |
| DE | 42 07 837 | 9/1993 |
| DE | 44 43 226 | 6/1995 |
| EP | 0 451 695 | 10/1991 |
| WO | 96 08907 | 3/1996 |

* cited by examiner

*Implementation example:
voice recognition in an exchange*

METHOD FOR VERIFYING ACCESS AUTHORIZATION FOR VOICE TELEPHONY IN A FIXED NETWORK LINE OR MOBILE TELEPHONE LINE AS WELL AS A COMMUNICATIONS NETWORK

FIELD OF THE INVENTION

The present invention relates to a method for verifying access authorization for voice telephony in a fixed network line or mobile telephone line as well as a communications network having such access authorization verification.

BACKGROUND OF THE INVENTION

In the case of private branch exchanges (PBXs) for telecommunications having a large number of extension stations used by different persons, but also in the case of mobile terminals such as cell phones, there exists the problem of abuse by unauthorized third parties or by unauthorized employees of a company. For example, personal conversations are frequently held via PBX lines of large corporations at the employer's expense. Moreover, when telephone calls are made from a stolen or lost mobile telephone, the account of the lawful owner is always charged without the owner being able to directly prevent this.

To prevent unauthorized use in private branch exchanges, methods are known in which the user of a terminal must enter an access code to be able to make an interoffice call and/or to dial specific outside numbers. In these methods, the subscriber enters a personal access code (PIN) via the keypad of the terminal, the access code being evaluated by the private branch exchange and compared with a table of authorized names. This method also makes it possible to allocate the incurred charges to specific individuals. Once the subscriber's authorization has been established in this manner, the corresponding PBX line is enabled to establish an interoffice or long-distance connection.

However, due to the additional time required, this method of entering a code before each call is very cumbersome and is not practical for PBX lines from which many calls are made regularly, e.g., a secretary's office or a senior executive's office. For that reason, such lines are frequently exempted from the access verification so that any person can call from them at any time and the problem of unauthorized use persists.

An additional known method is to detect unauthorized use after the fact by analyzing the call durations, the direction, and the subscriber or the number called. For this purpose, the private branch exchange logs the calls made, the call destinations, call duration, and the associated PBX line. A similar verification takes place in the network management system of a public switched telephone network. For example, all calls lasting longer than a predetermined duration are checked for the call destination later or during the connection. An unauthorized use can be detected if the call destination cannot be assigned to a predetermined group of telephone numbers, which, for example, are assigned to the company's customers. Individual PBX lines such as those of senior executives can be exempted from checking for unauthorized use in this case also.

However, even with this type of checking for unauthorized use, only line-specific determination of an unauthorized use is possible. Those cases in which the same person improperly uses different terminals without authorization cannot be detected. Moreover, the unauthorized use can only be detected after the fact; an unauthorized call cannot be prevented.

U.S. Pat. No. 5,623,539 relates to a device and a method for monitoring a telephone connection for unauthorized use. For this purpose, voice samples of all of the persons who are authorized to use the telephone connection are stored. During a conversation conducted over the telephone connection, the transmitted voice data is tapped and broken down via suitable means into individual voice samples, each of the thus-obtained voice samples corresponding to the voice of one of the conversation participants. These voice samples taken from the telephone conversation are compared to the stored voice samples. The telephone connection is only accepted as authorized when a sufficient match between at least one of the stored voice samples and at least one of the voice samples obtained from the telephone conversation is determined.

U.S. Pat. No. 5,093,855 relates to a method and a device for speaker recognition in a telephone switching exchange, where tapped speech samples are supplied via the telephone line to the exchange, where they are compared to previously stored speech samples. If the speaker is recognized, a first signal is emitted, otherwise, a second signal is emitted.

The publication "Speaker Identity Verification over Telephone Lines: Where we are and where we are going" by T. C. Feustel and G. A. Velius, International Carenaham Conference, Zurich 1989, addresses voice recognition and the security, e.g., against unauthorized telephone use, that it can provide. In this context, the possibility to increase security by combining voice recognition and the use of passwords or PINs is also mentioned.

SUMMARY OF THE INVENTION

The present invention provides a method for verifying access authorization for voice telephony that does not hamper the normal use of telephones and permits direct detection of attempts at unauthorized use and prevents them if necessary. In particular, the method of the present invention provides a method for verifying access authorization for voice telephone in a fixed network or mobile telephone line by voice recognition.

According to an embodiment of the present invention, voice signals of a subscriber placing a call are recorded before or after the communication connection to the subscriber being called is set up. For example, the subscriber can be automatically prompted to acoustically provide a password after dialing the outside number, but before the connection is established. Alternatively or in addition to this embodiment, the voice signals can be recorded during the course of the call, the voice signals of the subscriber placing the call being relayed concurrently to the subscriber called so that the communication is not disturbed. In both cases, the voice signal of the subscriber placing the call is analyzed by voice recognition algorithms and compared with a reference data record or several reference data records for purposes of assignment. The reference data record(s) is/are assigned to the fixed network line or mobile telephone line in an unambiguous manner; in particular, they define the group of persons having authorized access. According to the present invention, the communication connection can be automatically disconnected or not established and/or an alarm can be triggered, if the recorded voice sample cannot be assigned to any reference data record. Otherwise, the communication connection can be maintained or established in the customary manner.

In a further embodiment, the voice recognition can take place after the start of the communication connection online, i.e., directly during the communication connection. As with line tapping by police or intelligence services, the voice signals of the subscriber placing the call are tapped from the data line and supplied to a voice recognition unit, which analyzes them online. The voice data is transmitted concurrently to the person called. If the voice recognition unit is able to make an assignment to a reference data record, the analysis of the voice signal is terminated, and the data processing capacity of the voice recognition unit is available for identifying additional callers.

As an alternative to voice recognition during the connection, the speaker can be assigned to a billing account before the connection is established as part of an authentication procedure that the speaker must undergo. In this case, the telephone user is requested to provide a voice sample, and the connection is only established once the voice sample has been identified and the speaker is identified as authorized.

In addition to online voice recognition, the voice signal of the subscriber placing the call can also be recorded and stored in intermediate memory as a voice sample. The stored voice sample is then analyzed during or after the communication connection.

In embodiments of the present invention, it is not necessary to perform the cumbersome action of entering a password manually before the communication connection is established, but rather access is established and/or maintained by voice control. When access authorization is verified after the connection has been established, the process takes place concurrently with the normal flow of the call; the participants do not notice the access verification, but rather they are able to talk over the telephone in the normal manner, thus saving time. The same voice signals that are transmitted to the person called are analyzed for voice recognition and subscriber identification. This does not interfere with the transmission of voice signals between the conversation participants. Thus, in principle, any connection can be monitored for unauthorized use without interfering with the normal flow of telephone conversation by additionally entering access codes.

Several possibilities for voice recognition are known and can be used to implement the present invention. There are voice recognition algorithms for recognizing semantic content of speech that compare an actual voice sample with an already stored voice sample corresponding to a specific spoken word. In this context, the stored voice sample corresponds, for example, to a spoken word whose text representation is also stored. By determining a correspondence between the actual and the stored voice sample, it is possible to assign a textual representation, e.g., in the form of an ASCII representation, to the actual voice input, thus in principle making it possible to recognize the content of a voice message. Such voice recognition units are used, for example, for the voice control of computers and the like.

Or, the future user inputs the stored voice sample during a training phase. Thus, only the actual voice input of this user may be reliably recognized by the voice recognition, since even voice samples of different users that have the same semantic content vary due to individual speech patterns.

This technique can also be used in a refinement of the present invention to verify access authorization for a telephone line. In this connection, the reference data records are reference voice samples corresponding to specific words spoken by one person, e.g., typical greetings, the first or last name of a person having authorized access or other expressions which frequently occur in a telephone conversation. These voice samples are recorded in a training phase and stored in digital form in a memory as a reference data record. In order to implement the method, the voice recognition algorithms analyze the recorded voice data for the occurrence of fragments, i.e., individual words or expressions that match the reference voice sample within a specified tolerance range. In this connection, it is not the semantic content of the reference or of the actual voice signal that is of significance, but rather the individual speech pattern of the authorized and the calling persons which is expressed in a specific characteristic pattern of the reference voice sample.

Another embodiment of the present invention also provides for the analysis of the input voice signals for speech patterns that are characteristic of the user regardless of their semantic content. The specific intonation, voice register, dialect, and the like, which cause the voice of a person to appear nearly unique to the human ear, are manifested in characteristic features of a voice sample taken from this person, e.g., a specific frequency distribution, which can be used to identify this person by electronic means. Therefore, according to the present invention, reference speech patterns, e.g., frequency patterns or amplitude patterns, which are characteristic of one person, are stored as reference data records. For example, they can be obtained by statistical analysis of a voice sample using a corresponding voice recognition algorithm. To identify the actual voice sample recorded during a call, the voice recognition algorithms then create a corresponding speech pattern by statistically analyzing the sample. In this connection, statistical analysis primarily refers to a frequency analysis in which the tone and voice register of the speaker can be identified; dynamic analysis refers to the dynamics of the voice signal, i.e., the amplitude characteristic and, accordingly, a specific intonation. Both methods are suitable for identifying a speaker. This speech pattern is then compared with the reference speech patterns. It is determined whether the characteristic features of both patterns agree. In creating the reference speech pattern from a reference voice sample, the same voice recognition algorithm is used as that which with the actual voice sample is analyzed.

In this embodiment of the present invention, the analysis of the individual speech patterns can make a significantly more accurate identification of the speaking person possible than the search for specific words which, although individually characterized, may not always be reliably detectable due to the shortness of the words. The first variant is particularly suited for access verification by entering a specific spoken password, while the second variant is particularly suited for covertly verifying the access authorization during an ongoing call.

In a further embodiment, the reference data records correspond to the group of authorized persons, e.g., all the employees of a company who must make telephone calls as part of their work activity. The reference data records are stored, for example, in a table of authorized names. In this context, one person can be authorized only for selected telephone numbers or types of connections, or authorization can change as a function of the time of day.

The method according to the present invention can further prevent the use of terminals for the placement of toll calls by persons not belonging to this authorized group, while any authorized person can place calls from any PBX line of the company.

In another embodiment of the present invention, the access authorization can further differentiated according to PBX lines. The reference data record or reference data records are unambiguously assigned to a PBX line of a private branch exchange. The reference data record or reference data records, in turn, define the group of authorized persons, in this case for a single PBX line. This makes it possible to prevent persons authorized per se from placing telephone calls from other terminals. This is useful in the event that individual lines are cleared for interoffice calls but not for long distance calls, while this limitation does not exist for other PBX lines.

In the event of an access verification during the connection, the voice signals can be tapped during a predetermined time interval, e.g., 30 to 60 seconds, the recording starting in particular immediately after the connection is established. The voice sample is already analyzed during the tapping or at the end of the time interval.

For reasons of data security and privacy, the recorded and possibly buffered voice sample is erased after the voice recognition is completed, if it was possible to assign the sample to a reference data record. However, in the case of unauthorized use, i.e., no automatic assignment can be made to a reference data record and, accordingly, to an authorized person, the voice data preferably remains stored. It can then be used to identify the speaker.

In order to keep the expense for verifying access authorization as low as possible, the method can be implemented only at certain times of the day and/or week and/or only via specific call destinations, e.g., only for long-distance connections. The fixed network or mobile telephone line in question, or individual PBX lines of a fixed network line are then completely blocked or completely cleared for connections outside of these time periods or for other call destinations.

Moreover, it is provided that the access verification by voice recognition is not implemented if, before a connection is established, the user enters a key combination, e.g., a PIN code or an acoustic signal, e.g., a sequence of MFC signals, and has his authorization verified via this access code.

A further embodiment of the present invention provides that the number of unauthorized access attempts is recorded and the line is blocked if more than a predetermined number of such attempts is detected within a predetermined time interval, e.g., one day or one hour. In addition, an alarm can first be triggered via the network management system, and an operator can be switched in.

A further embodiment of the present invention can involve a communication network having a plurality of fixed network lines or mobile telephone lines, as well as technical means for establishing a communication connection between two or more lines of the same or of a different communication network, including:
a) means that are capable of accessing a data line via which voice signals are at least partially transmitted from the calling line to the called line, and that are capable of recording a voice signal transmitted by the calling line;
b) at least one memory in which reference data records are stored which are assigned to a group of persons having access authorization; and
c) at least one control unit having a voice recognition unit which is capable of accessing the memory for the reference data records, analyzing the tapped voice signal via voice recognition algorithms, and determining the access authorization of the subscriber placing the call by comparison with the reference data records, the control unit initiating the production of a signal to disconnect the connection if the voice signal cannot be assigned to any of the reference data records, so that voice samples are recorded at regular time intervals during the entire communication connection, and the speaker's authorization is checked at regular time intervals.

In this context, a communication network can be understood to be the totality of all lines including the exchanges or conversion stations and possibly data lines and other intelligent switching and transmission devices. The elements involved in the present invention can, however, be arranged in only a small part of the network, e.g., in a private branch exchange. The communication network according to the present invention advantageously makes it possible to verify the access authorization of users of individual lines and accordingly to implement the method according to the invention.

In order to be able to utilize the voice signals in a detected case of abuse, to identify the unauthorized caller or for offline voice analysis, the communication network may have at least one memory in which the recorded voice signals are stored in intermediate memory as voice samples.

According to the present invention, the verification of access authorization within the communication network can take place at various points within the network. If the access authorization of users of a private branch exchange is to be verified, the control unit and the reference data memory or possibly the voice sample memory can be arranged within the private branch exchange. The control unit can be, for example, part of a data processing system that logs the connections made by the individual PBX lines, blocks individual PBX lines on a time-dependent basis or for specific call destinations, and possibly requests a PIN code.

Alternatively, the control unit and the corresponding memory locations can be located outside the customer area in an exchange in the actual telephone network. In this case, the reference data of the lines assigned to the exchange can be stored in the reference data memory. Preferably, the reference data is stored in a line-specific manner, so that an authorized group of persons is defined for each line and is checked by the exchange. If the control unit is unable to assign the voice sample to any of the reference data records, it causes the exchange to generate a signal disconnecting the connection. In this manner, a common control unit can be used to centrally verify the access authorization of users of a plurality of lines in the exchange without requiring a modification of the lines on the customer side.

Access verification can be further centralized by assigning the control unit and the corresponding memory to an SCP (Service Control Point) of an intelligent network and by the control unit causing the SCP to generate a signal interrupting the connection if the voice sample cannot be assigned to any of the reference data records. The so-called intelligent network is an open communications network, which is built on the traditional telephone network and makes various telephone services having new features possible, for example, toll-free calling using specific numbers or reaching various offices of a corporation using a dial number that is identical over a larger region. The central computer containing the required switching information is known as the SCP. The transition from a telephone network of one network provider to that of a different network provider is also accomplished using structures similar to an IN.

In addition, the method according to the present invention can also be used to check the authorization of a mobile terminal user. For this purpose, a mobile terminal for telecommunications is proposed, including:
a) means that are capable of accessing a data line, via which voice signals are transmitted in electronic form, and of recording an entered signal and a voice signal;

b) at least one memory in which at least one or more reference data records are stored which are assigned to a group of persons having access authorization; and c) at least one control unit having a voice recognition unit which is capable of accessing the memory for the reference data records, analyzing the tapped voice signal via voice recognition algorithms, and of determining the access authorization of the subscriber placing the call by comparison with the reference data records, the control unit initiating the production of a signal to disconnect the connection or causing the terminal to shut off if the voice signal cannot be assigned to any of the reference data records, so that voice samples are recorded at regular time intervals during the entire communication connection, and the speaker's authorization is checked at regular time intervals.

The reference data record(s) can be stored on the chip of a mobile telephone card. The owner of the mobile telephone can provide the voice sample necessary for this purpose when purchasing the mobile telephone card. Therefore, a lost mobile telephone is, in principle, operable, but the mobile telephone card is only operable as a function of the correct speech pattern. This can prevent calls from continuing to be made on a lost mobile telephone at the owner's expense.

DETAILED DESCRIPTION

Figure 1:
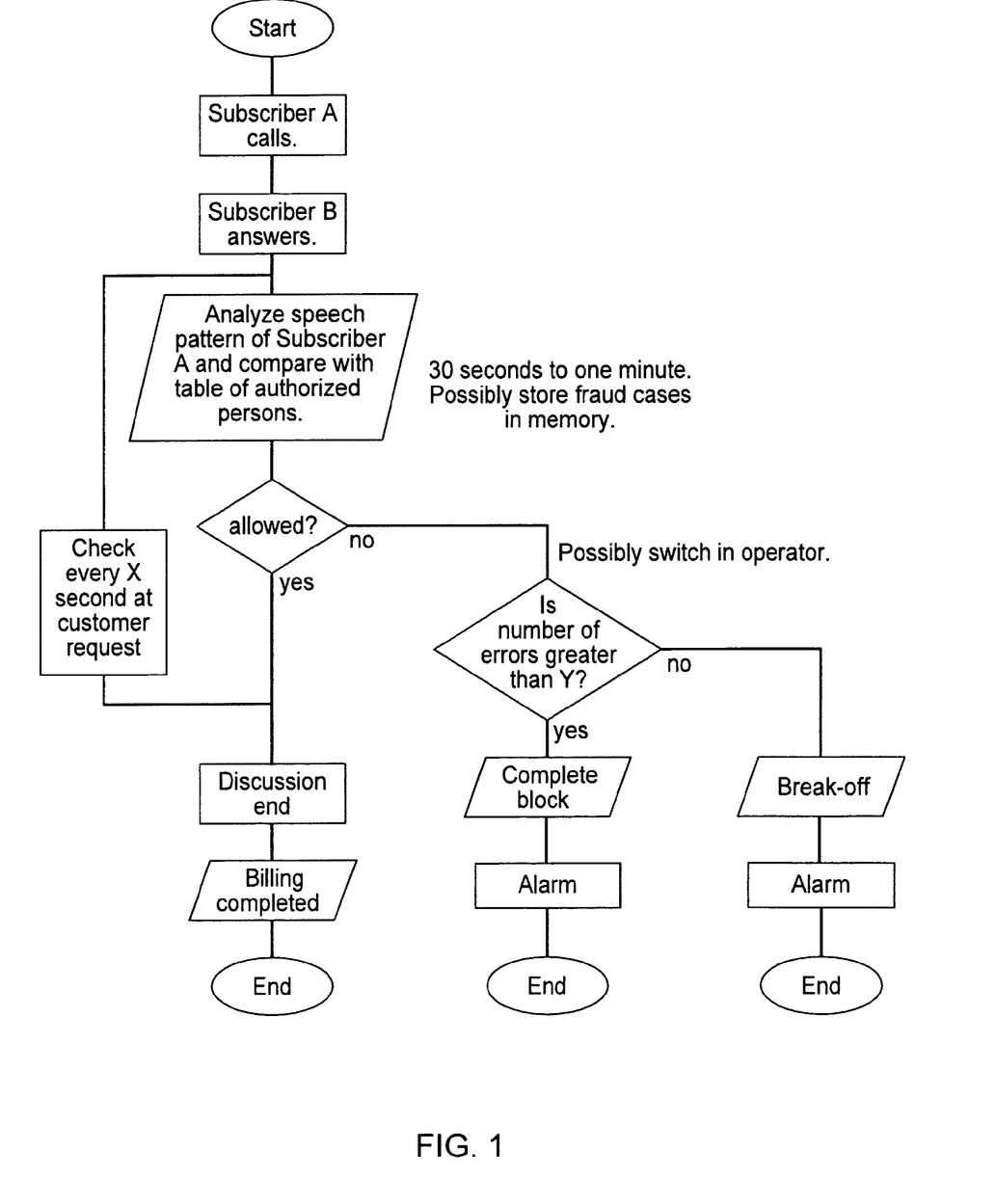
FIG. 1 shows a schematic of the sequence of operations of an embodiment of the present invention.

FIG. 1 schematically shows a sequence of operations of an embodiment of the method of the present invention. At the start of the method, subscriber A calls a destination number. The connection is established as soon as subscriber B answers. Typically, both subscribers begin to speak. The voice signals of subscriber A are automatically tapped and analyzed, the analysis lasting a predetermined time span, approximately 30 seconds to one minute. A interoffice trunk, via which the voice signals between both users are transmitted, is accessed without interfering with the transmitted signal, so that the access verification does not affect the conversation.

The voice signal of subscriber A is analyzed, i.e., compressed by voice recognition algorithms, the thus-produced speech pattern being compared with reference data records stored in a table of authorized names. If the actual voice signal can be assigned to one of the reference data records, then the subscriber is considered to be authorized and entitled to call. In this context, the table of authorized persons can refer specifically to the line as a whole or to a PBX line and/or it may be time-dependent.

If subscriber A is approved, then the connection is maintained until the end of the call. In the simplest case, no additional check is made. To further increase security against abuse, the process is repeated at regular time intervals, i.e., the voice signal of subscriber A is analyzed again.

If the subscriber is identified as unauthorized, because his voice signal cannot be assigned to an entry in the table of authorized persons, the connection is interrupted in the simplest case by generating a interrupting signal or by briefly deactivating the terminal. A new connection can be established immediately after the connection is terminated.

To counteract persistent attempts at unauthorized use, it is also possible to record the number of attempts at unauthorized use within a specific time interval and to set a critical value for the maximum number to be tolerated. If the number of attempts at unauthorized use exceeds this value, a total block of the line is automatically initiated. The line can then only be enabled again after a specific waiting period or by the entering an enabling code. In addition, as in the case of a normal termination due to unauthorized use, an alarm signal can be produced at the telephone itself or at a PBX operator desk.

Figure 2:
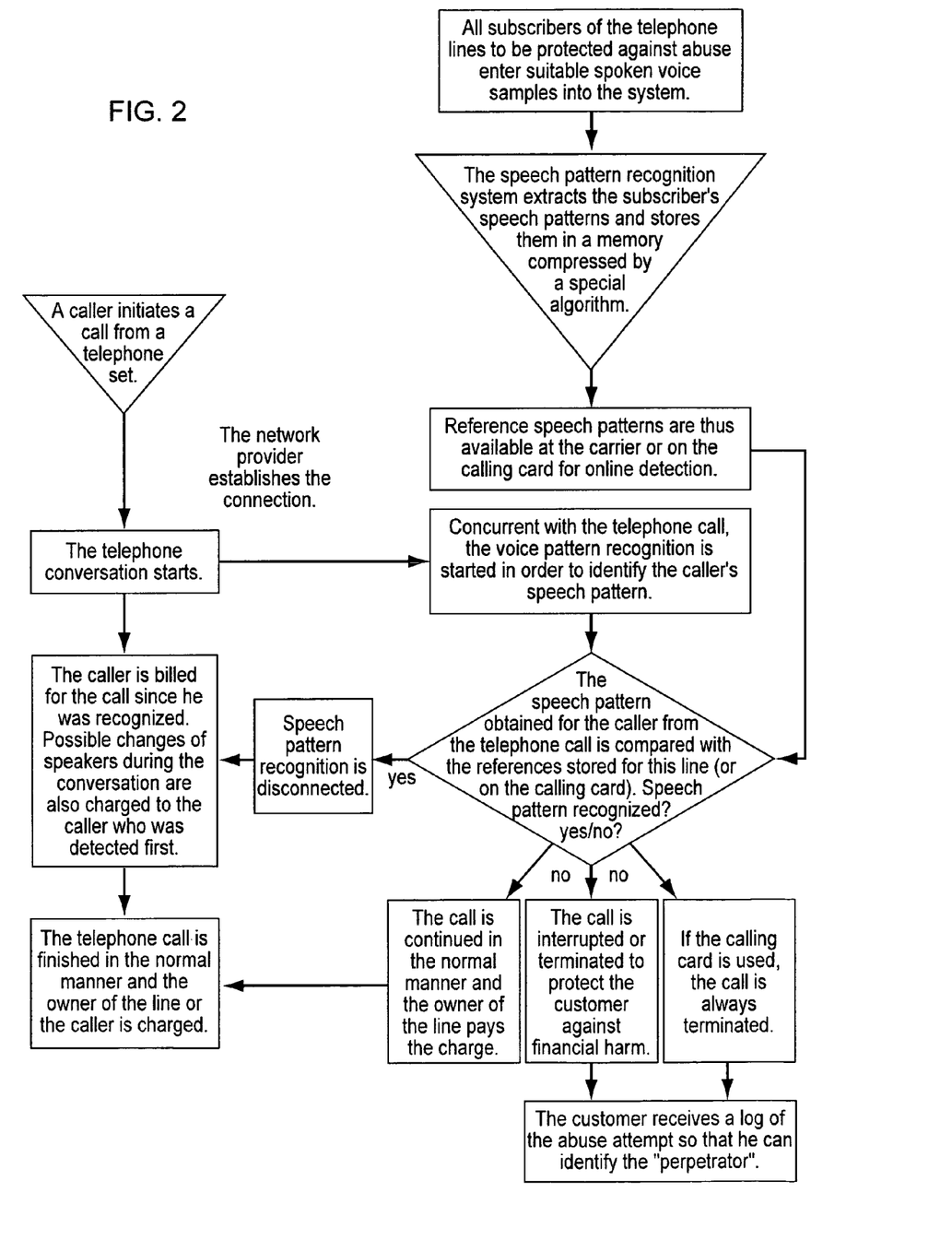
FIG. 2 shows a flowchart of another embodiment of the present invention.

FIG. 2 shows an additional flowchart of the method according to the present invention. Before the method is initiated, all users of the telephone line to be protected against abuse enter voice samples into the system. The voice recognition unit or a speech pattern recognition system extracts the subscribers' speech patterns and stores them, compressed by a voice recognition algorithm, in memory as reference data. The reference speech patterns are, thus, available for online recognition at the facilities of the network provider, in a private branch exchange, or on the calling card of a mobile telephone.

The process begins once a caller initiates a call from a telephone, the telephone connection is established by the network provider, and the telephone conversation is started. At the same time as the telephone call, the speech pattern recognition is initiated to determine the speech pattern of the caller. This speech pattern determined for the caller from the telephone call is compared with the reference stored for this line or on the calling card of a mobile telephone.

If a speech pattern is recognized, i.e., the actual voice signal matches a reference, the speech pattern recognition for this connection is discontinued, and the computer capacity can be used to analyze other calls.

If no speech pattern is recognized, the call is interrupted to protect the customer from financial loss. When a mobile telephone is used with a calling card, the call is always terminated. If necessary, the customer can be provided with a log of the attempt at unauthorized use in order to identify the person using the telephone without authorization.

Figure 3A:
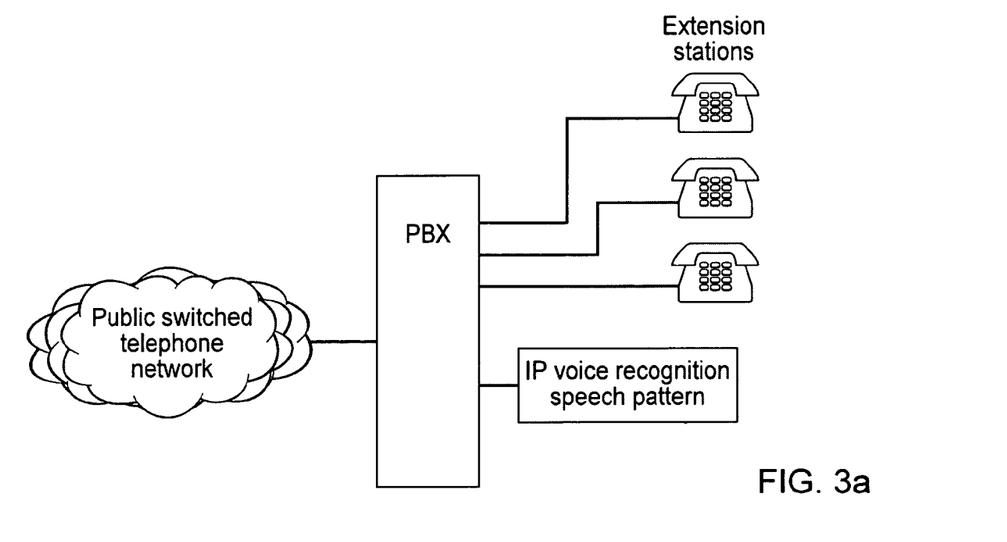
FIG. 3a shows a communication network used with an embodiment of the present invention.
Figure 3B:
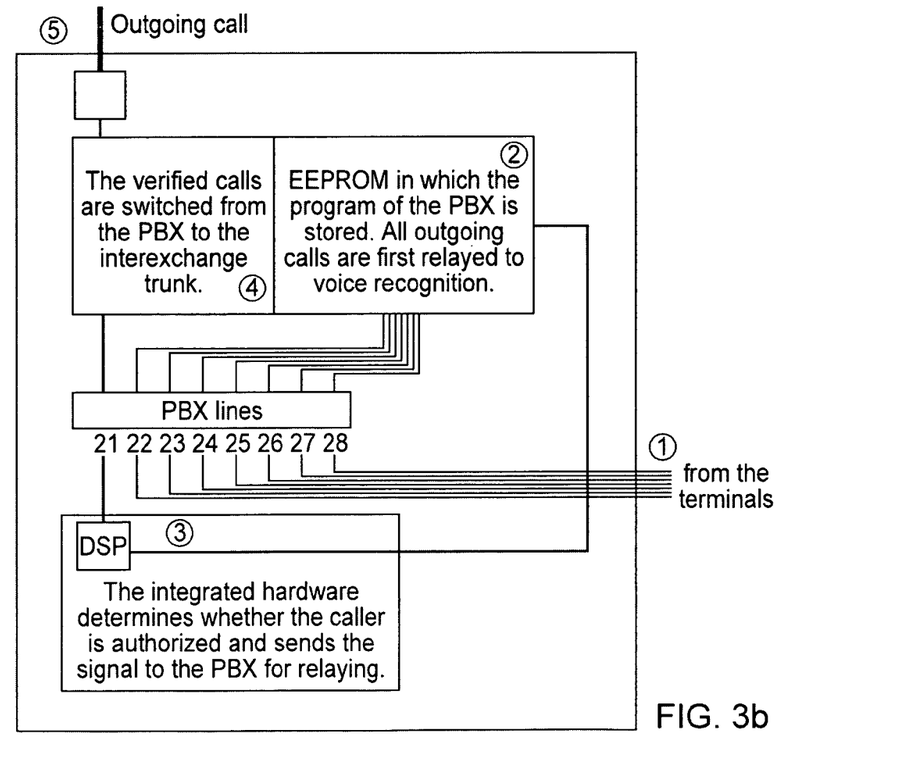
FIG. 3b shows a communication network used with an embodiment of the present invention.
Figure 4A:
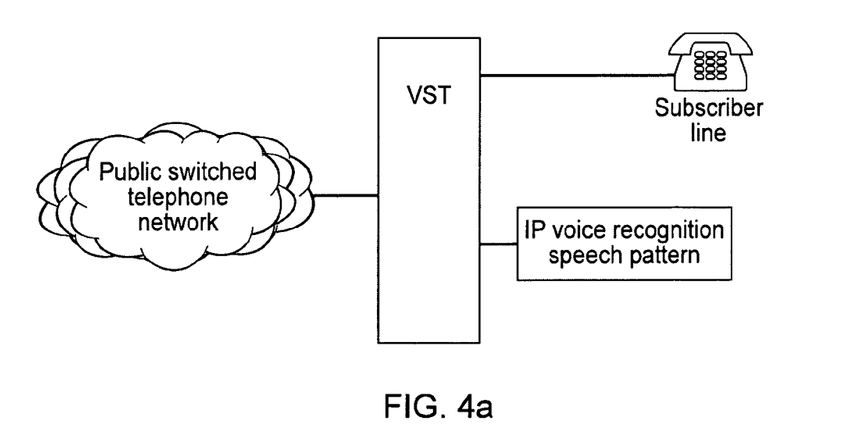
FIG. 4a shows a communication network used with an embodiment of the present invention.
Figure 4B:
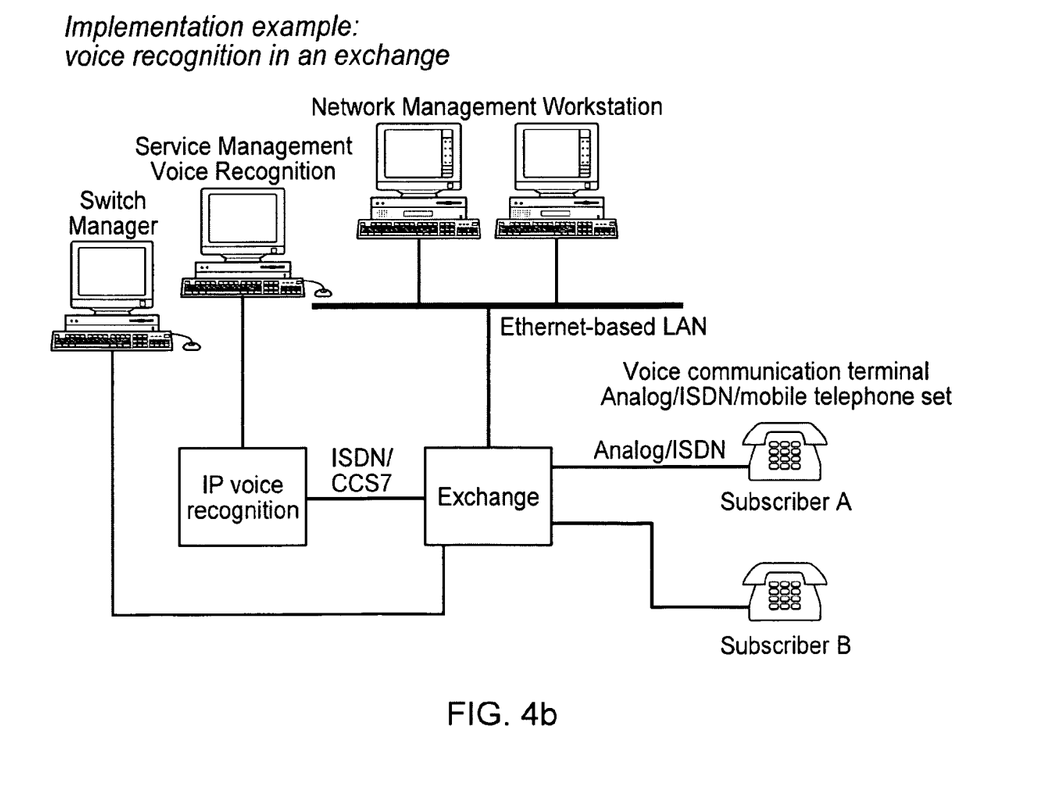
FIG. 4b shows a communication network used with an embodiment of the present invention.
Figure 4C:
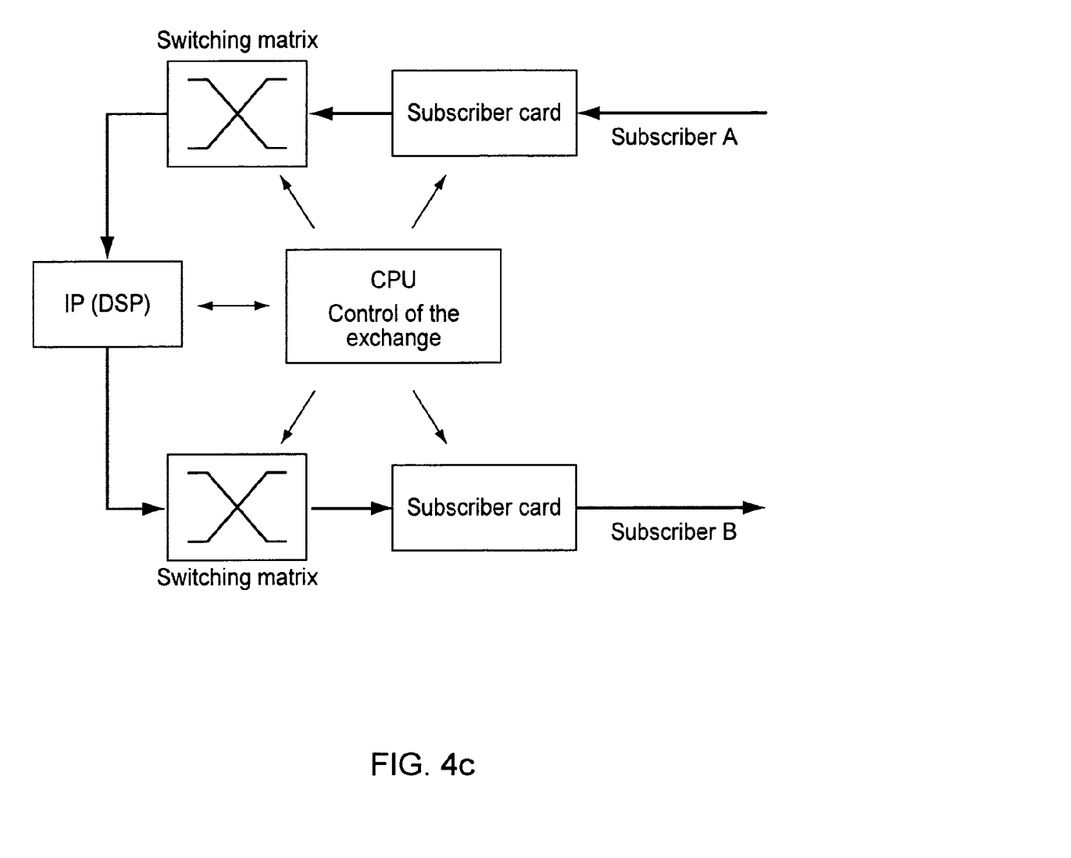
FIG. 4c shows a communication network used with an embodiment of the present invention.
Figure 5:
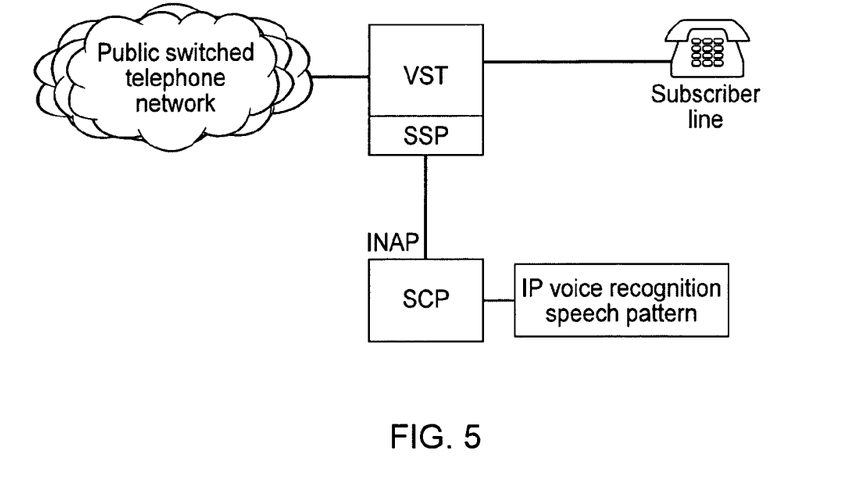
FIG. 5 show a communication network used with an embodiment of the present invention.

FIGS. 3 through 5 show three possibilities for implementing the method according to the present invention in a communications network.

For this purpose, FIG. 3A shows a private branch exchange (PBX), which is connected to a public switched telephone network. The private branch exchange (PBX) has a plurality of extension stations, of which three are shown here. The access authorization of the users of the individual extension stations is to be monitored according to the present invention. For this purpose, an IP (intelligent peripheral) is assigned to the private branch exchange (PBX), the IP being capable of accessing the telephone line via which signals are transmitted from one extension station to an additional line outside the private branch exchange, and of recording and storing the signals entered by the extension station user. In addition, the IP has a voice recognition unit that is capable of analyzing the recorded voice signal and comparing it with previously stored reference data records. In addition, the IP is also capable of accessing the reference data record memory. In this case, either specific reference data records are assigned to each extension station, the reference data records being assigned to the users of this extension station, or the table of authorized persons contains all potential users of the entire private branch exchange irrespective of the actual PBX line.

If the IP cannot match the actual voice sample to any of the reference data records, it applies a suitable control signal to induce the private branch exchange (PBX) to generate a signal interrupting the connection. As a result, the connection of a PBX line to a user in the public switched telephone network via the private branch exchange is interrupted.

FIG. 3B shows an example for the implementation of person-specific assignment of charges by voice recognition in a private branch exchange.

In the private branch exchange, in the case of procedural authentication, i.e., voice recognition before a connection is established, all calls originating from the terminals connected to PBX lines (ports 22 to 28) are redirected to one port (port 21 in the illustrated example). This redirection is performed by the control unit of the private branch exchange. The relevant programs are stored, for example, in a memory module, an EEPROM in this case. A digital signal processor (DSP) having suitable voice recognition software and, optionally, voice recognition hardware is connected to port 21. If the identification is positive, it relays the signal to the private branch exchange via the customary control functions, i.e., either via the line, a V.24 interface, or another management interface. The thus-verified calls are switched from the private branch exchange (PBX) to the interexchange trunk and form an outgoing call. The billing information for person-specific cost assignment is fed directly into the billing system.

In the case of online recognition of the speaker, the call is already set up; however, as in the case of "bugging" a call, the call information is serially routed through the DSP. The DSP analyzes the speech without interfering with the transmission and relays corresponding information to the private branch exchange or the billing system.

FIG. 4A shows an arrangement of control unit IP corresponding to the arrangement of FIG. 3A in an exchange. A connection from the subscriber line to an additional line in the public switched telephone network is established via this exchange. Physically and organizationally, the exchange is assigned to the subscriber line; however, it is not necessarily located in its immediate vicinity. Aside from the different physical arrangement of the IP, the access verification is performed here in the same manner as described above. The difference is that no intelligent devices for voice recognition and for speech storage need to be provided on the subscriber side, since these are centrally integrated in the exchange.

FIG. 4B shows an example for the implementation of access verification by voice recognition in an exchange of a telephone network.

Voice recognition system IP can be implemented in a computer, for example in the form of a plug-in module in the exchange. Calls for which the speaker is to be identified are routed from the exchange through the IP.

Voice recognition is implemented either in dialog form, i.e., an authentication procedure is executed as described above in FIG. 3B, or else the voice is recognized online. In the latter case, the speech pattern is checked during the conversation in progress and characteristics of the speech of speaking user A are compared with the stored patterns. In this case, the call is tapped, so to speak, by the IP without interfering with it.

One possible structure for the authentication procedure is a dial-in into the DSP of the IP. For this purpose, the telephone channel is routed to an input of the IP. At this point, subscriber A is asked by the software of an intelligent voice response system to state his name or his identifier. After that, he is asked for his password or his personal identification number PIN. The data is compared with the identifier stored in memory, and the speech pattern is compared with the stored patterns either using frequency spectra or speech dynamics. In the dialog form, the implementation of voice recognition is very simple, since the identifier is made up of precisely defined words, which were previously entered.

After authentication in the IP, the customer is directed to a menu that requests that he enter the desired telephone numbers. These are recorded as in conventional messaging or voice response systems, converted into pulse or MFC dialing information, and sent into the network, or they are relayed to the exchange as signals in the format of signaling system No. 7 (Common Channel Number 7, CCS7). The exchange then initiates the connection to subscriber B. The use of CCS7 signals permits faster processing and more features, namely all those implemented in CCS7 and cleared for the IP.

The information concerning the speaker, i.e., the identified reference data record, is sent as control information to the exchange via the CCS7, and generates an alarm in the network management system. The network management system can also generate a corresponding alarm message regarding call data records, so that the billing system also receives appropriate information.

The speaker-identifying data records produced in this way are used for access verification; however, they can also be used for billing a call. The corresponding procedures are described in the flowcharts.

When recognizing continuous speech, the system preferably concentrates on the essential characteristics of the language. To be sure, key words such as "good morning, hello," etc. can be considered in the entry procedure; however, in principle, it is necessary to store speaker-specific characteristics, irrespective of which language and with whom the user is speaking. For this purpose, the algorithm can use static methods such as frequency spectrum analysis, as well as dynamic speech characteristics.

FIG. 4C shows an additional example of the method according to the present invention implemented in an exchange. The subscriber unit (subscriber card) of subscriber A recognizes whether the subscriber has provided voice recognition for access verification. The central processing unit CPU of the exchange initiates the appropriate routing through the switching matrix, the actual switching unit. As a result, the call is not routed directly to subscriber B or to the next exchange, but rather it is first routed through an intelligent peripheral IP having a digital signal processor (DSP). The output port of the IP is routed through the switching matrix to subscriber B or to the next exchange.

All control information and, accordingly, also the result of the voice recognition are compared in the exchange having the central processing unit CPU.

The IP can also include several voice recognition units or DSPs and, thus, analyze several lines simultaneously. The information concerning the usage of the IP and concerning the analytical results is transmitted to the CPU.

FIG. 5 shows the implementation of the method according to the present invention in the service control point SCP of an intelligent network.

When implemented in the IN, the voice data is routed via an ISDN channel to voice recognition unit IP, which is located at the site of the SCP. Control information, for example, whether the calling line is using voice recognition for monitoring abuse, results from the voice analysis, and the like are then exchanged between the SCP and the service switching point SSP, which is located at the site of the exchange.

Implementing the method according to the present invention in the centrally structured IN makes it possible to centrally implement voice-based abuse control over a large network area, i.e., a plurality of lines. This eliminates the need for expensive software and hardware equipment in the exchanges; only the IN must be adapted. This implementation is, therefore, suitable in particular for cases of low demand or in the introductory phase, i.e., it is not yet worthwhile to equip each exchange.

The present invention is suitable, in particular, for operators of communication networks to increase the security of voice telephony customers against abuse. Moreover, the present invention is particularly suitable for operators of private branch exchanges where the problem of unauthorized access is encountered on a regular basis.

What is claimed is:

1. A method of verifying access authorization for voice telephony for a fixed network line or a mobile telephone line, comprising:
   providing a first voice signal of a first subscriber placing a telephone call;
   analyzing the first voice signal via a voice recognition algorithm when one of (a) before a communication connection between the first subscriber and a second subscriber is established and (b) after the communication connection between the first subscriber and the second subscriber is established, and if the analyzing begins after the communication connection between the first subscriber and the second subscriber is established then the first voice signal and a second voice signal of the second subscriber continue to be relayed;
   comparing the first voice signal with a voice reference data record to determine an identity of the first subscriber;
   determining if the first voice signal is in the voice reference data record and if the first voice signal is not in the voice reference data record then at least one communication effect occurs, the at least one communication effect including not establishing the communication connection, automatically interrupting the communication connection and generating an alarm in the communication connection;
   recording the first voice signal before and after a communication connection to the second subscriber is established;
   assigning the voice reference data record to the fixed network line or the mobile telephone line; and
   recording a voice sample of the first subscriber and the second subscriber at regular time intervals during the communication connection and checking the first and second voice signals with the voice reference data record.

2. The method of claim 1, wherein the voice reference data record contains reference voice samples corresponding to at least one specific spoken word, and the voice recognition algorithm analyzes a recorded voice signal with the reference voice samples for a match within a determined tolerance range.

3. The method of claim 1, wherein the voice reference data record corresponds to a reference speech pattern independent of semantic content and characteristic of a person, and the voice recognition algorithm creates a corresponding speech pattern from the recorded voice signal by statistically analyzing the recorded voice signal, the corresponding speech pattern being compared with the reference speech pattern.

4. The method of claim 3, wherein the reference speech pattern is characteristic of a specific frequency distribution of spoken language by the person.

5. The method of claim 1, wherein the reference data record is assigned to a PBX line of a private branch exchange.

6. The method of claim 1, wherein the recorded voice signal is recorded during a predetermined time interval after the initiation of the communication connection, and the recording is terminated at a conclusion of the communication connection.

7. The method of claim 1, wherein the recorded voice signal is stored in an intermediate memory, and further comprising erasing the recorded voice signal stored in the intermediate memory if the recorded voice signal is determined as matched with the reference data record, and continuing to store the recorded voice signal if the recorded voice signal is determined as not-matched with the reference data record.

8. The method of claim 1, wherein the method is actuated only at at least one of a predetermined time of day, a predetermined time of month, and a predetermined call destination, and the communication connection cannot be established during at least one of a time outside the predetermined time of day, a time outside of the predetermined time of month, and a call destination outside of the predetermined call destination.

9. The method of claim 1, further comprising assigning a predetermined authorization code to the fixed network line or the mobile telephone line and if the first subscriber enters the predetermined authorization code before the communication connection is established then the method is not actuated, the first subscriber entering the predetermined authorization code by at least one of an acoustic signal and via a key pad.

10. The method of claim 1, further comprising recording an amount of an attempt of unauthorized access of the fixed network line or the mobile telephone line and blocking the access of the fixed network line or the mobile telephone line if the amount of the attempt of unauthorized access is equal to or larger than a predetermined maximum attempt value within a predetermined time interval.

* * * * *